US010868743B2

(12) United States Patent
Slaight et al.

(10) Patent No.: US 10,868,743 B2
(45) Date of Patent: Dec. 15, 2020

(54) SYSTEM AND METHOD FOR PROVIDING FAST PLATFORM TELEMETRY DATA

(71) Applicant: Intel Corporation, Santa Clara, CA (US)

(72) Inventors: Thomas M. Slaight, Beaverton, OR (US); Johan G. Van De Groenendaal, Portland, OR (US)

(73) Assignee: Intel Corporation, Santa Clara, CA (US)

(*) Notice: Subject to any disclaimer, the term of this patent is extended or adjusted under 35 U.S.C. 154(b) by 192 days.

(21) Appl. No.: 15/170,454

(22) Filed: Jun. 1, 2016

(65) Prior Publication Data
US 2017/0353367 A1 Dec. 7, 2017

(51) Int. Cl.
H04L 12/26 (2006.01)
H04L 29/06 (2006.01)

(52) U.S. Cl.
CPC .............. *H04L 43/06* (2013.01); *H04L 43/04* (2013.01); *H04L 43/08* (2013.01); *H04L 43/10* (2013.01); *H04L 63/0428* (2013.01)

(58) Field of Classification Search
CPC ...... H04L 43/06; H04L 43/04; H04L 63/0428
USPC ........................................................ 709/224
See application file for complete search history.

(56) References Cited

U.S. PATENT DOCUMENTS

| | | | | |
|---|---|---|---|---|
| 6,725,235 | B1* | 4/2004 | Dyer | G06F 17/5009 707/999.1 |
| 6,909,667 | B2 | 6/2005 | Shah et al. | |
| 7,757,023 | B1* | 7/2010 | Ranganathan | G06F 13/4022 709/225 |
| 9,165,457 | B1* | 10/2015 | Bertagnolli, Jr. | H04Q 9/00 |
| 9,900,299 | B2* | 2/2018 | Oppenheim, Jr. | H04L 63/08 |
| 2007/0288626 | A1* | 12/2007 | Cunningham | G08C 25/00 709/224 |
| 2008/0218375 | A1 | 9/2008 | Viswanathan et al. | |
| 2008/0301783 | A1 | 12/2008 | Abrutyn et al. | |
| 2012/0239800 | A1* | 9/2012 | Matichuk | H04L 41/0809 709/224 |
| 2014/0172971 | A1 | 6/2014 | Akkurt et al. | |
| 2014/0240140 | A1* | 8/2014 | Switzer | E21B 47/122 340/854.6 |
| 2014/0313917 | A1* | 10/2014 | Jung | H04L 67/327 370/252 |

(Continued)

FOREIGN PATENT DOCUMENTS

WO 2016043778 A1 3/2016

OTHER PUBLICATIONS

PCT International Search Report from PCT/US2017/034876 dated Sep. 13, 2017; 8 pages.

*Primary Examiner* — Joseph L Greene
(74) *Attorney, Agent, or Firm* — Patent Capital Group

(57) ABSTRACT

In one embodiment, a request for telemetry data measured by a plurality of components of a computing platform is received from a computing device. Contextual information associated with the requested telemetry data is provided in a first communication, wherein the contextual information comprises information describing the plurality of components. An instance of the requested telemetry data is provided to the computing device, wherein the telemetry data is provided in a second communication that omits at least a portion of the contextual information describing the plurality of components.

25 Claims, 5 Drawing Sheets

(56) References Cited

U.S. PATENT DOCUMENTS

2015/0301572 A1\* 10/2015 Zhou ............... G06F 1/3203
                                                      713/320
2016/0248620 A1\* 8/2016 Itkin ............... H04L 41/04
2017/0006135 A1\* 1/2017 Siebel ............. H04L 67/02

\* cited by examiner

SYSTEM AND METHOD FOR PROVIDING FAST PLATFORM TELEMETRY DATA

FIELD

The present disclosure relates in general to the field of computer development, and more specifically, to providing fast platform telemetry data.

BACKGROUND

A computing infrastructure may include one or more computing platforms that each comprise at least one processor, at least one associated memory module, and at least one network interface controller providing communication with one or more networks. Various components of the computing infrastructure may include telemetry engines that collect telemetry data associated with their respective components.

BRIEF DESCRIPTION OF THE DRAWINGS

Like reference numbers and designations in the various drawings indicate like elements.

DETAILED DESCRIPTION

Figure 1:
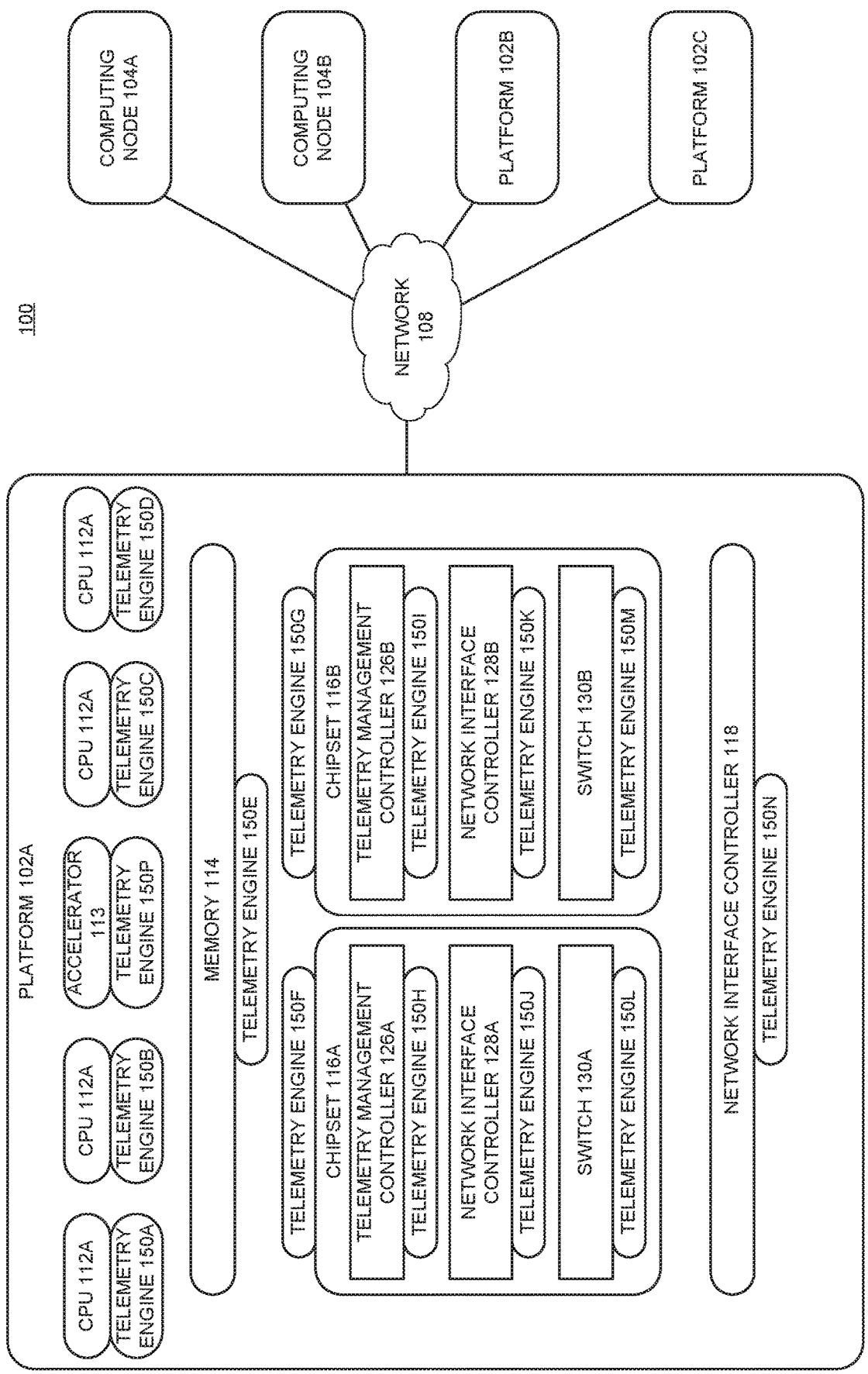
FIG. 1 illustrates a block diagram of a computing infrastructure in accordance with certain embodiments.

FIG. 1 illustrates a block diagram of components of a computing infrastructure 100 in accordance with certain embodiments. In the embodiment depicted, computing infrastructure 100 includes a plurality of platforms 102 and computing nodes 104 coupled together through network 108. A platform 102 may include a variety of computing logic, such as one or more central processing units (CPUs) 112, memories 114 (which may include any number of different modules), chipsets 116, network interface controllers 118, and any other suitable hardware and/or software. Computing nodes 104 may include hardware and/or software similar to the hardware and/or software of platforms 102 and may communicate with other computing nodes 104 and/or platforms 102.

In various embodiments, computing infrastructure 100 may represent any suitable combination of computing devices (e.g., platforms 102, computing nodes 104, or other computing devices) comprising various physical elements. For example, computing infrastructure 100 may comprise a datacenter, a communications service provider infrastructure (e.g., one or more portions of an Evolved Packet Core), an infrastructure of a cloud service provider, a corporate network, or other suitable computing infrastructure comprising a group of compute hosts.

Manageability data (e.g., telemetry data) conforming with standards such as Common Information Model (CIM) or Redfish published by the Distributed Management Task Force (DMTF) is delivered to local or remote applications (e.g., applications running on computing nodes 104) encapsulated in verbose, context rich, abstracted data formats that may involve significant software processing to create and transfer. The overhead from these formats presents a challenge to providing platform telemetry data with low latency and high throughput. However, the context information that is provided in accordance with the standards may be important for particular users.

Various systems may utilize a telemetry management controller to serve as a data aggregator, perform the formatting of the telemetry data, and oversee the network protocols that are used to deliver the telemetry data to the consumer. Standards such as Redfish are designed to use fairly heavyweight networking protocols and byte-inefficient/verbose data representations that transfer small amounts of data with much larger transfers of context information. The ratio of overhead-to-data can be 100-to-1 or more. In such systems, the significant processing of the data performed by the telemetry management controller and the verbosity of the processed data increases the latency and reduces the scalability of the solution. In various embodiments, by separating the underlying data transfer from the context transfer, using more compact formats, and utilizing telemetry engines that bypass processing by the telemetry management controller, performance and scalability can increase significantly while taking advantage of the existing ecosystem of telemetry management controllers and network interface controllers (which may also include sideband hardware support). In various embodiments, the consumer of the telemetry data also benefits by avoiding the parsing out of overhead data when processing the received telemetry data. Also, much less data may be moved over the network than with the standard model, facilitating both faster processing/reaction to the telemetry data and increased scalability.

Various embodiments of the present disclosure may deliver fast telemetry data while linking to a standard format used to send telemetry data by utilizing one or more telemetry management controllers 126, telemetry engines 150, and network interface controllers 128 or 118 (optionally with sideband interfaces) to deliver platform telemetry data via a fast path with minimal overhead introduced on the collection and transport of the telemetry data. In various embodiments, this may involve separating the transmission of the telemetry data and the redundant context information associated with the telemetry data.

As used herein, "fast path telemetry data" may refer to telemetry data that is provided by the platform 100 to a consumer in a format that is briefer than a format that is used to provide "slow path telemetry data." As nonlimiting examples, the format that is used to provide "slow path telemetry data" may conform to a standard for providing telemetry data, such as CIM, Redfish, or other DMTF or other standard. In various embodiments, the format used to provide slow path telemetry data may include context information that is omitted from the fast path telemetry data.

Various embodiments of the present disclosure utilize a telemetry management controller 126 to deliver context data and provide a configuration interface. The telemetry management controller 126 may use a configuration interface to configure telemetry engines 150 to autonomously collect, format, and send telemetry data to the consumer (e.g., computing node 104 or platform 102) of the data over the network or locally to a user of the platform 102. In various embodiments, the telemetry data sent by the telemetry engine 150 may conform to a transport protocol (e.g., Management Component Transport Protocol (MCTP)) that is suited for transferring telemetry data and is supported by the network interface controllers 118 or 128. In various embodiments, the network interface controller 118 or 128 used to send the telemetry data over the network 108 may be integrated with the telemetry management controller 126. For example, these components may be located on the same integrated circuit chip or circuit board (e.g., line card).

A platform 102 from which telemetry data is collected may include one or more CPUs 112, one or more memories 114, one or more chipsets 116, and one or more network interface controllers 118. Although three platforms are illustrated, computing infrastructure 100 may include any suitable number of platforms. In various embodiments, a platform 102 may reside on a circuit board that is installed in a chassis, rack, or other suitable structure that comprises multiple platforms coupled together through network 108 (which may comprise, e.g., a rack or backplane switch).

CPUs 112 may each comprise any suitable number of processor cores. The cores may be coupled to each other, to memory 114, to at least one chipset 116, and/or to network interface controller 118, through one or more controllers residing on a CPU 112 and/or a chipset 116. In particular embodiments, a CPU 112 is embodied within a socket that is permanently or removeably coupled to platform 102. Although four CPUs are shown, a platform 102 may include any suitable number of CPUs. A CPU 112 may comprise any processor or processing device, such as a microprocessor, an embedded processor, a digital signal processor (DSP), a network processor, an application processor, a co-processor, a system on a chip (SOC), or other device to execute code. CPU 112 may include any number of processing elements that may be symmetric or asymmetric. In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

Accelerator 113 may comprise any suitable logic to perform specialized processing tasks on behalf of one or more CPUs. Any specialized processing tasks may be performed by accelerator 113, such as graphics processing, cryptography operations, mathematical operations, TCP/IP processing, or other suitable functions. In particular embodiments, accelerator 113 may be coupled to one or more CPUs 112 via a dedicated interconnect. In particular embodiments, accelerator 113 may comprise programmable logic gates. For example, accelerator 113 may be a field-programmable gate array (FPGA). In various embodiments, the accelerator 113 may be located on the same chip as a CPU 112 or on a different chip.

Memory 114 may comprise any form of volatile or non-volatile memory including, without limitation, magnetic media (e.g., one or more tape drives), optical media, random access memory (RAM), read-only memory (ROM), flash memory, 3D crosspoint memory, removable media, or any other suitable local or remote memory component or components. Memory 114 may be used for short, medium, and/or long term storage by platform 102. Memory 114 may store any suitable data or information utilized by the logic of platform 102, including software embedded in a computer readable medium, and/or encoded logic incorporated in hardware or otherwise stored (e.g., firmware). Memory 114 may store data that is used by cores of CPUs 112. In some embodiments, memory 114 may also comprise storage for instructions that may be executed by the cores of CPUs 112 or other processing elements (e.g., logic resident on chipsets 116) to provide functionality associated with a telemetry management controller 126, telemetry engine 150, or other component of platform 102. Additionally or alternatively, chipsets 116 may each comprise memory that may have any of the characteristics described herein with respect to memory 114. Memory 114 may also store the results and/or intermediate results of the various calculations and determinations performed by CPUs 112 or processing elements on chipsets 116. In various embodiments, memory 114 may comprise one or more modules of system memory coupled to the CPUs through memory controllers (which may be external to or integrated with CPUs 112). In various embodiments, one or more particular modules of memory 114 may be dedicated to a particular CPU 112 or other processing device or may be shared across multiple CPUs 112 or other processing devices.

A platform 102 may also include one or more chipsets 116 comprising any suitable logic to support the operation of the CPUs 112. In various embodiments, chipset 116 may reside on the same package as a CPU 112 or on one or more different packages. Each chipset may support any suitable number of CPUs 112. A chipset 116 may also include one or more controllers (e.g., network interface controller 118 or one or more I/O controllers or memory controllers) to couple other components integrated with or external to the platform (e.g., switch 130, disk drives, displays, input devices, etc.) to communicate with the CPU cores or other platform components. Additionally or alternatively, the CPUs 112 may include integrated controllers. For example, network interface controller 118 could be coupled directly to CPUs 112 via integrated I/O controllers resident on each CPU.

A platform may include any number of telemetry management controllers 126. In the embodiment depicted, the telemetry management controllers are located on chipsets 116 though in other embodiments they may be located at any suitable location in a platform (e.g., a telemetry management controller 126 could be integrated onto a CPU 112 or be electromechanically coupled to the chipset 116). In a particular embodiment, telemetry management controller 126 (which may also be referred to as an innovation engine, a manageability engine, or a baseboard management controller) is capable of managing the collection of real-time telemetry data from any suitable components of the platform 102, such as the chipsets 116 or components thereof, CPU(s) 112 or components thereof, memory 114 or components thereof, other components of the platform, or various connections between components of platform logic 110. A telemetry management controller 126 may communicate with one or more telemetry engines 150 that are associated with (e.g., integrated with or coupled to) various components of the platform 102. The telemetry management controller 126 may configure a telemetry engine 150 to collect particular telemetry data from its associated component (and any components within the component). The telemetry management controller 126 may also configure the telemetry engine 150 to process the collected telemetry data and/or to send the collected telemetry data to the telemetry management controller 126 for processing or to a network interface controller 118 or 128 for transmission to a consumer of the telemetry data. The configuration process will be described in more detail in connection with FIG. 2.

In various embodiments, the telemetry management controller 126 operates as an out-of-band asynchronous compute agent which is capable of interfacing with the various components of platform logic 110 (via telemetry engines 150) to collect telemetry data with no or minimal disruption to running processes on CPUs 112. For example, telemetry management controller 126 may comprise a dedicated processing element (e.g., a processor, controller, or other logic) on chipset 116 which provides the functionality of telemetry management controller 126 (e.g., by executing software instructions), thus conserving processing cycles of CPUs 112 for other operations. Moreover the dedicated logic for the telemetry management controller 126 may operate asynchronously with respect to the CPUs 112 and may gather at least some of the telemetry data without increasing the load on the CPUs. In various embodiments, telemetry management controller 126 may include programmable code configurable to set which CPU(s) 112 the chipset 116 will manage and/or which telemetry data will be collected.

Platform 102 includes any suitable number of telemetry engines 150 that may each be associated with (e.g., integrated with or coupled to) one or more components of the platform 102. The telemetry engines 150 may collect any suitable telemetry data from their associated components, process the data, and/or provide the data to other components of the platform, such as a telemetry management controller 126 or network interface controller 118. Any suitable telemetry data may be collected by the various telemetry engines 150, such as utilization of a component, temperature of a component, voltage of a component, current of a component, or other suitable metrics associated with a component (or components within the component associated with the telemetry engine). For example telemetry data collected by telemetry engines 150 may include current CPU cache usage, current CPU core usage, current memory bandwidth use, and current I/O bandwidth in the aggregate or by one or more entities (e.g., operating system, virtual machine, or other entity), element thereof (e.g., thread, application, etc.), or I/O device (e.g., Ethernet device or storage device controller). Other examples of telemetry data that may be collected by telemetry engines include an amount of available memory space or bandwidth, an amount of available CPU cache space or bandwidth, an amount of available CPU core bandwidth, or available I/O bandwidth for each I/O device. Additional examples of telemetry data that may be collected by telemetry engines 150 include temperatures, currents, or voltages from various points of platform 102, such as at one or more locations of each core, one or more locations of each CPU 112, one or more locations of chipsets 116, or other suitable locations of the platform 102 (e.g., air intake and outflow temperatures may be measured). An example telemetry engine will be explained in further detail in connection with FIG. 2.

Platform 102 may also include one or more network interface controllers (NICs), also known as network interface cards or network adapters. The network interface controllers may be located at any suitable location of platform 102. For example, in the embodiment depicted, chipsets 116 each include one or more network interface controllers 128. As another example, platform 102 may include one or more additional network interface controllers 118 located off of the chipset.

Network interface controllers 128 may be used for the communication of signaling and/or data between chipset 116 and one or more networks 108 and/or one or more computing nodes coupled to network 108. For example, NIC 128 may be used to send and receive network traffic such as data packets. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable components of chipset 116 (e.g., telemetry engines 150F, 150H, 150J, 150L, telemetry management controller 126, or switch 130) or components (e.g., other telemetry engines 150) coupled to the chipset and another computing device coupled to network 108. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, NIC 128 may communicate telemetry data, context data associated with the telemetry data, and configuration data associated with the collection of telemetry data between one or more telemetry engines 150, one or more telemetry management controllers 126, and one or more computing devices coupled to network 108. In various embodiments, telemetry management controller 126 may utilize NIC 128 to report the telemetry data in order to reserve usage of network interface controller 118 for other operations.

Platform 102 may include one or more additional network interface controllers (NICs) 118. NIC 118 may have any suitable characteristics described herein with respect to NIC 128. Similar to NIC 128, NIC 118 may be used for the communication of signaling and/or data between components of platform 102 and one or more networks 108 and one or more devices coupled to the network 108. For example, NIC 118 may be used to send and receive network traffic such as data packets. NIC 118 may enable communication between any suitable component of platform 102 (e.g., CPUs 112, telemetry engines 150, or telemetry management controllers 126) and another device coupled to network 108 (e.g., elements of other platforms or remote computing nodes coupled to network 108 through one or more networks). In various embodiments, NIC 118 may be coupled to the CPUs through I/O controllers (which may be external to or integrated with CPUs 112).

Switch 130 may couple to various ports of NIC 128 and may switch data between these ports and various components of chipset 116 (e.g., one or more Peripheral Component Interconnect Express (PCIe) lanes coupled to CPUs 112). Switch 130 may be a physical or virtual (i.e., software) switch.

Platform may perform any suitable type of processing requests for any suitable entity. A processing request may include any request to utilize one or more resources of platform 102, such as one or more cores or associated logic. For example, a processing request may comprise a request to execute or instantiate a software component (such as an operating system, hypervisor, application, or virtual machine); a request to process a received network packet; a request to execute a workload (e.g., process or thread) associated with a virtual machine, application, hypervisor or other operating system running on platform 102, or other suitable request.

Although not shown, in various embodiments platform 102 may include one or more I/O controllers that allow components of the platform (e.g., CPUs 112) to communicate with physical I/O devices. In various embodiments, the underlying physical I/O device may be coupled to any of CPUs 112 and may send data to CPUs 112 and receive data from CPUs 112. The underlying I/O device may utilize any suitable communication protocol, such as PCI, PCIe, Universal Serial Bus (USB), Serial Attached SCSI (SAS), Serial ATA (SATA), InfiniBand, Fibre Channel, an IEEE 802.3 protocol, an IEEE 802.11 protocol, or other current or future signaling protocol. The underlying I/O device may include one or more ports operable to communicate with cores of the CPUs 112. In one example, the underlying I/O device is a physical NIC or physical switch. In other embodiments, underlying I/O devices may include any suitable device capable of transferring data to and receiving data from CPUs 112, such as an audio/video (A/V) device controller (e.g., a graphics accelerator or audio controller); a data storage device controller, such as a flash memory device, magnetic storage disk, or optical storage disk controller; a wireless transceiver; a network processor; or a controller for another input device such as a monitor, printer, mouse, keyboard, or scanner; or other suitable device.

The elements of platform 102 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computing infrastructure 100 may be coupled together in any suitable manner such as through one or more networks 108. A network 108 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices. A network offers communicative interfaces between sources and/or hosts, and may comprise any local area network (LAN), wireless local area network (WLAN), metropolitan area network (MAN), Intranet, Extranet, Internet, wide area network (WAN), virtual private network (VPN), cellular network, or any other appropriate architecture or system that facilitates communications in a network environment. A network can comprise any number of hardware or software elements coupled to (and in communication with) each other through a communications medium.

Figure 2:
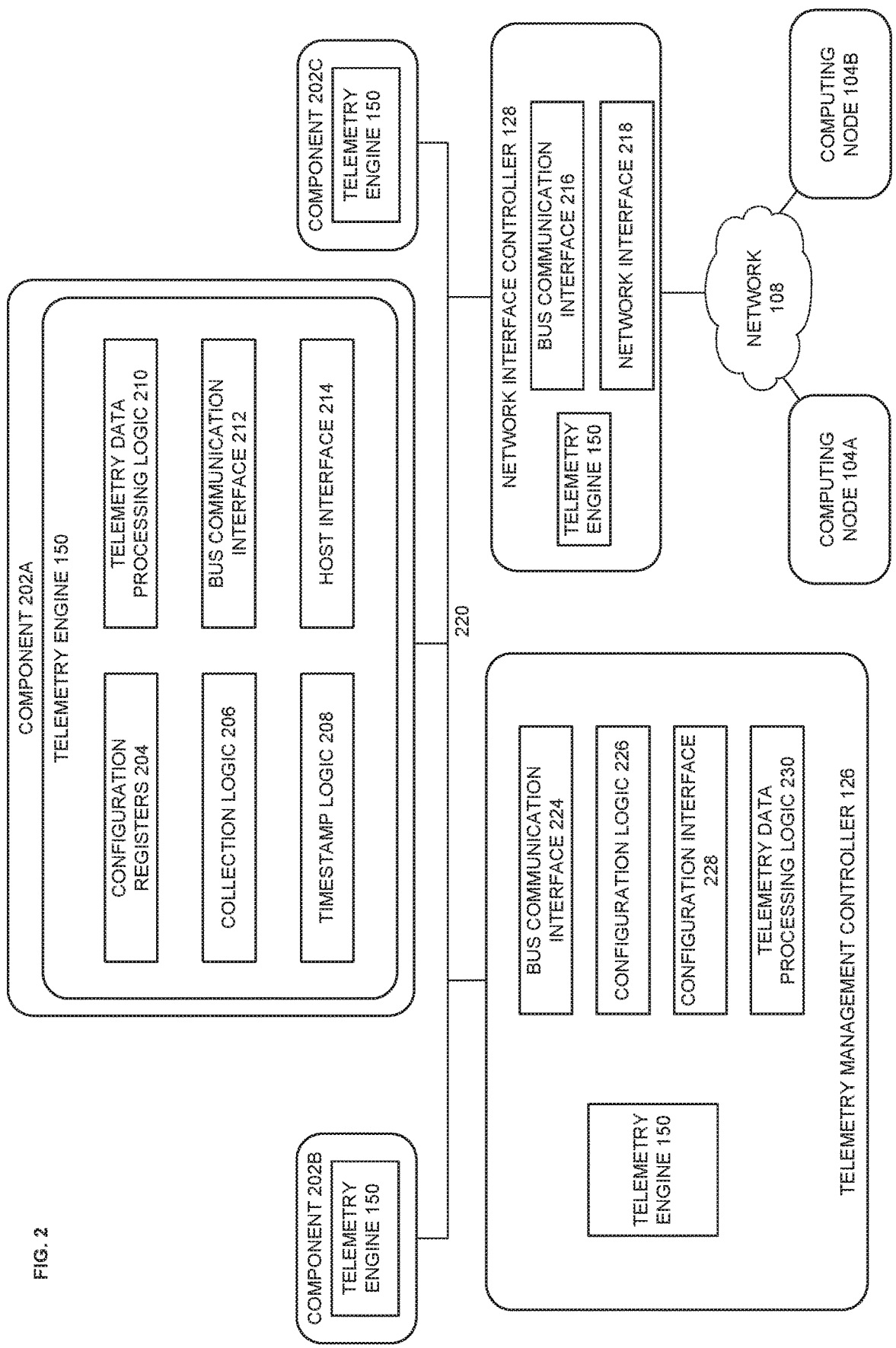
FIG. 2 illustrates a block diagram of various components of a computing infrastructure in accordance with certain embodiments.

FIG. 2 illustrates a block diagram of various components of a computing infrastructure in accordance with certain embodiments. The diagram depicts various components 202, a telemetry management controller 126, and network interface controller 128 coupled together through bus 220 and coupled to remote computing devices (e.g., computing nodes 104) through network 108.

Telemetry management controller 126 may include any suitable logic to configure telemetry engines 150 to collect telemetry data for one or more consumers of the data (e.g., computing nodes 104). In the embodiment depicted, telemetry management controller 126 includes bus communication interface 224, configuration logic 226, configuration interface 228, telemetry data processing logic 230, and a telemetry engine 150.

The bus communication interface 224 includes logic to receive telemetry data, context data associated with the telemetry data, or configuration data associated with the collection of telemetry data. Interface 224 may also process data received into a format suitable for use by other components of the telemetry management controller 126 (e.g., by parsing out information added to the data in order to communicate the data over bus 220). Interface 224 may also provide processed telemetry data, context data, or configuration data to other components of the system (e.g., telemetry engines 150 or network interface controllers 128). In various embodiments, interface 224 may format the provided data in a fashion suitable for a transport protocol used over bus 220. Any suitable transport medium and/or transport protocol (and/or lower level protocol) may be used by the various components (and their respective bus communication interfaces) of the computing infrastructure to send data between the various components (e.g., over the bus 220). In various embodiments, data sent over the bus 220 using the various bus communication interfaces (e.g., 212, 216, and 224) may conform with MCTP, NC-SI over MCTP, or NC-SI over a reduced media-independent interface (RMII) based transport (RBT) protocol. In a particular embodiment, bus communication interface 224 is an MCTP interface.

In various embodiments, the bus 220 may comprise any suitable communication medium, such as a System Management Bus (SMBus), an Inter-Integrated Circuit (I$^2$C) bus, one or more serial links, a PCIx bus, a Universal Serial Bus (USB), or other suitable bus. In various embodiments, the bus may be a multi-master, multi-slave bus such that the various bus communication interfaces may provide data to the bus 220 without first having to coordinate with the other bus communication interfaces.

Configuration logic 226 may comprise any suitable logic to manage the configuration of telemetry engines 150. In particular embodiments, configuration logic 226 may store (using any suitable memory) indications of the various types of telemetry data available to be provided by the various telemetry engines to one or more consumers. For example, configuration logic 226 may store indications of each component that is capable of providing telemetry data and the type(s) of telemetry data that each component is capable of providing. In various embodiments, configuration logic 226 may also store indications of consumers that are authorized to receive at least a portion of the telemetry data and which telemetry data such consumers are authorized to receive. In a particular embodiment, configuration logic 226 may also store an indication of whether a particular set of telemetry data may be provided via a fast path and/or a slow path.

A consumer may utilize any suitable computing device to connect to the telemetry management controller 126 to register to receive telemetry data (or to direct that telemetry data be sent to another consumer). Herein, an entity that connects to the telemetry management controller 126 to register to receive telemetry data or to register for one or more other consumers to receive telemetry data will be referred to as a registering consumer. In various embodiments, a registering consumer may connect to controller 126 via a computing device coupled to the platform through network 108. As another example, a registering consumer may connect to the telemetry management controller 126 through a software application running on platform 102.

When a registering consumer sends a registration request to the telemetry management controller 126, the controller may respond with a list of the telemetry data that is available to be provided (to the consumer registering or to one or more other consumers specified by the registering consumer). In various embodiments, the list of available telemetry data and/or each respective set of data within the list (which may include one or more types of telemetry data for one or more components) may be associated with a unique identifier, such as a Uniform Resource Identifier (URI), a universally unique identifier (UUID), a globally unique identifier (GUID), a numerical identifier, or a text based name or label.

Although the list may take any form, in one embodiment, the list of available telemetry data may be included in an Extensible Markup Language (XML) document sent from telemetry management controller 126 to the consumer. In various embodiments, a globally unique identifier for a particular set of telemetry data identified in the XML document may be obtained by parsing information from various tags in the XML document.

The registering consumer may register for all or one or more sets of the telemetry data specified in the list. The registering consumer may provide any suitable indications to the telemetry management controller 126 to signal registration for the telemetry data. For example, the registering consumer may provide the unique identifiers for the particular telemetry data sets for which it desires to register. As another example, the consumer may indicate that all of the telemetry data should be provided.

In various embodiments, during an initial registration phase, the registering consumer registers to receive telemetry data via a slow path. After the slow path data is received by a consumer, the consumer may then use identifiers of one or more sets of the telemetry data included in the slow path data to register to receive the one or more sets of telemetry data via a fast path. In other embodiments, in the initial registration, the registering consumer may request that the identified telemetry data sets be provided as fast path telemetry data. In such embodiments, the platform may provide to a consumer a first instance (i.e., measured telemetry data) of the telemetry data sets as slow path telemetry data and subsequent instances of the telemetry data sets as fast path telemetry data without requiring additional registration for the fast path telemetry data by the consumer after the slow path telemetry data is received.

In various embodiments, the registering consumer may provide additional configuration information during registration. For example, the consumer may provide an indication of which consumer(s) should receive the telemetry data. For example, the registering consumer may specify that the data should be sent to a computing node 104 used by the registering consumer or to a different computing node 104 associated with a different consumer. In various embodiments, the registering consumer may register for any number of different consumers to receive unique (or common) sets of the available telemetry data. The indication(s) of where the telemetry data should be sent may take any form, such as one or more IP addresses or other identifiers of computing nodes associated with the consumers of the data.

In association with registration, the registering consumer may receive a mapping document from the telemetry management controller 126 or other platform component. In various embodiments, respective mapping documents may also be sent to other consumers identified during the registration performed by the registering consumer. In various embodiments, a mapping document may include context information that may be omitted from fast path telemetry data. For example, such context information may include descriptions of components that produce particular telemetry data, descriptions of how particular telemetry data is encoded, descriptions of units (e.g., volts, amps, degrees, etc.) of particular telemetry data, descriptions of how the telemetry data is ordered (e.g., a first value is a temperature of a particular core, a second value is a voltage of the core, a third value is a temperature of a second core, etc.), descriptions of where particular telemetry data is to be located within the fast path platform telemetry data (e.g., for each piece or set of telemetry data, the mapping document may specify an offset within the fast platform telemetry data), or other suitable context information associated with the telemetry data. In various embodiments, each set of telemetry data may be identified within the mapping document by a unique identifier (which in some embodiments may be the same unique identifier for the set of telemetry data within the list of available telemetry data provided during registration).

The mapping document may allow a consumer of fast path telemetry data to decipher the meaning of the fast path telemetry data. In various embodiments, the mapping document may provide information that would allow the consumer to reconstruct received fast path telemetry data into a format equivalent to a format that would have been used if the telemetry data had been provided via a slow path (e.g., a format compliant with a standard for providing telemetry data, such as CIM, Redfish, or other DMTF or other standard).

In various embodiments, a mapping document may include or otherwise be associated with a unique identifier, such as a URI, UUID, GUID, a numerical identifier, or a text based name or label. In various embodiments, this same unique identifier may be sent with fast path telemetry data corresponding to the mapping document such that a consumer of the fast path telemetry data may identify the mapping document corresponding to the fast path telemetry data. In a particular embodiment, a consumer of fast path telemetry data may identify a corresponding mapping document without utilizing a unique identifier within the mapping document. For example, a consumer may only have been registered for one set of fast path telemetry data and may have received a single mapping document. As another example, a consumer may use a mapping document received from a particular IP address when fast path telemetry data is received from the same IP address (or an associated IP address). In various embodiments, a mapping document may include multiple unique identifiers corresponding to multiple sets of context data included within the mapping document. Each of these sets of context data may correspond to a set of fast path telemetry data sent to one or more consumers.

In various embodiments, a mapping document is generated and returned in response to a registration by a registering consumer. In some embodiments, the mapping document may omit any instances of telemetry data, but may merely include context information associated with telemetry data to be provided later to the consumer (or context information associated with telemetry data that has already been provided to the consumer if the mapping document is sent to the consumer after registration has already been performed). In other embodiments, the list of available telemetry data that is provided to the registering entity may comprise the mapping document. In yet other embodiments, the mapping document may simply be slow path telemetry data that comprises an instance of measured telemetry data (since the slow path telemetry data already includes the context for the telemetry data).

In particular embodiments, mapping documents may be generated and sent by the telemetry management controller 126 to multiple different consumers in response to a registration by a registering consumer. In a particular embodiment, a mapping document may be sent to a registering consumer and the registering consumer may provide the mapping document to other consumers. In one embodiment, a consumer may request a mapping document from the telemetry management controller 126 at any suitable time (such as after receiving fast path telemetry data). In a particular embodiment, the consumer may provide a unique identifier corresponding to the mapping document when requesting the mapping document.

In various embodiments, the registering consumer may also provide information associated with digital signatures or encryption (e.g., keys) to be used by one or more telemetry management controllers 126 or telemetry engines 150 when communicating telemetry data to the registering consumer (or other consumer).

In particular embodiments, during registration (or anytime thereafter) the registering consumer may provide the telemetry management controller 126 with an indication of requested data polling rates for various telemetry data sets (i.e., how often the particular telemetry data should be measured), an indication of requested transmission rates for various telemetry data sets (i.e., how often instances of the measured telemetry data should be sent to the consumer), or an indication of a transmission format for the telemetry data (e.g., how the telemetry data should be encoded (e.g., full binary, JavaScript Object Notation (JSON)-encoded, or other format)).

The configuration logic of the telemetry management controller 126 may verify the acceptability of the registration by determining whether the parameters specified by the registering consumer are valid and may notify the registering consumer of any invalid parameters. In particular embodiments, if a parameter is invalid, telemetry management controller 126 may notify the consumer of such or respond to the registering consumer with a valid parameter. The telemetry management controller 126 may also verify the presence of one or more consumers indicated in the registration (e.g., by sending a message to the consumer and checking whether a response is received).

In response to registration, the configuration logic 226 may configure one or more telemetry engines 150 with parameters specified during the registration (the configuration logic 226 may also configure the telemetry engines 150 in response to requests received from a consumer after the initial registration is performed). As various examples, the configuration logic 226 may cause the telemetry engines to be configured with information indicating which telemetry data is to be transmitted to which consumers, whether telemetry data is to be provided via a slow path or a fast path, polling rate parameters, transmission rate parameters, formatting parameters for the telemetry data, digital signature or encryption information (e.g., keys), information identifying the consumers (e.g., IP addresses of the consumers), or other suitable configuration information. In particular embodiments, configuration logic 226 may also configure the telemetry engines 150 with one or more addresses of other components of the platform (e.g., other telemetry management controllers 126 or network interface controllers 128) that may be involved in processing the telemetry data before the data is sent by the platform to the consumer.

In various embodiments, the configuration logic 226 may configure the telemetry engines through configuration interface 228. Configuration interface 228 may include any suitable logic to communicate with telemetry engines 150. Configuration interface 228 may couple to the telemetry engines 150 via any suitable communication medium such as bus 220 or other communication link.

Telemetry data processing logic 230 may include any suitable logic to process an instance of telemetry data received from a telemetry engine 150 before the telemetry data is provided to a network interface controller 128 for transmission to a consumer. In various embodiments, firmware of the telemetry management controller 126 or a software stack may perform this processing.

In various embodiments, slow path telemetry data may be provided by processing the data by telemetry data processing logic 230. Any suitable processing may be performed by logic 230 to implement the slow path. For example, logic 230 may bundle received telemetry data with context information identifying the components that produced the telemetry data as well as other information associated with the telemetry data. In a particular embodiment, the telemetry data may be encapsulated within textual context information in accordance with a telemetry data standard such as CIM, Redfish, or other DMTF or other standard. In particular embodiments, the contextual information added may have various levels. For example, telemetry data indicating a temperature of a core may be included within tags or other identifiers that specify that the measurement unit is degrees Celsius, that the measurement was obtained from a particular core of a particular processor located on a particular motherboard or backplane of a particular platform (where each component may be identified by a separate tag).

In various embodiments, for each set of telemetry data, logic 230 may include a unique identifier for the set of data within the processed telemetry data (e.g., a URI in the case of Redfish). As another example, logic 230 may also encode the telemetry data according to any suitable protocol or standard, such as JSON, XML, HTTP, HTTPS (or other streaming protocol) or other suitable standard and form the telemetry data into data packets having headers and payload data. As another example, logic 230 may also digitally sign and/or encrypt the telemetry data.

After the telemetry data is processed into slow path telemetry data, the telemetry data processing logic 230 may provide the data to the bus communication interface 224 for transmission to a network interface controller 128 that will send the processed data over network 108 to a computing node 104.

In various embodiments, telemetry data processing logic 230 may additionally or alternatively be used to provide fast path telemetry data. In such embodiments, telemetry engines 150 provide collected telemetry data to the telemetry management controller 126 for processing and then the processed data is sent to a network interface controller 128. In producing the fast path telemetry data, the telemetry data processing logic 230 may perform any suitable processing of telemetry data received from telemetry engines 150, such as any of the processing listed above. However, the fast path telemetry data may omit particular information that is included in the slow path telemetry data, such that the fast path telemetry data has a more compact format than the slow path telemetry data. For example, the fast path telemetry data may omit at least a portion of the context information that is included in the slow path telemetry data. In a particular embodiment, the fast path telemetry data does not include any context information associated with the telemetry data, but merely includes measured telemetry values. In another particular embodiment, the fast path telemetry data may include a unique identifier of a mapping document associated with the fast path telemetry data along with measured telemetry values. In yet another embodiment, the fast path telemetry data may include a set of unique identifiers associated with each set of data included in the telemetry data (e.g., an identifier for a set of data corresponding to a particular core, a second identifier for a set of data corresponding to a second core, etc.). As explained earlier, the mapping document provided to the consumer may specify how to derive the context information from received fast path telemetry data.

In various embodiments, the fast path telemetry data may utilize a format, encoding, or protocol that is more compact than a format, encoding, or protocol of the slow path telemetry data. In various embodiments, the fast path telemetry data may be encoded within a web service format (e.g., JSON, XML). In other embodiments, the fast path telemetry data may be encoded using a binary format (that may or may not include formal delimiters between data points). For example, the fast path telemetry data may include successive data points in a binary format (e.g., one byte represents one measured telemetry value, the next byte represents another measured telemetry value, and so on). In another embodiment, the fast path telemetry data may include a series of American Standard Code for Information Interchange (ASCII) strings with delimiters where each string represents at least one measured telemetry value (and where each string may or may not include a portion of the corresponding context information that would be included in the slow path telemetry data or a unique identifier). The fast path telemetry data may utilize any other suitable format (e.g., a type, length value format).

In various embodiments, the fast path telemetry data is transferred using a more efficient network protocol than a streaming protocol (e.g., a HTTPS/TLS based protocol) used to transmit slow path telemetry data. For example, a non-streaming User Datagram Protocol (UDP)-based protocol may be used to transmit the fast path telemetry data. The non-streaming protocol may avoid the overhead of reliable delivery (retries), multi-packet assembly, temporal ordering, or other overheads that are imposed by protocols such as TLS. Such a protocol may be used under the assumption that the fast path telemetry data may have a limited lifetime and is updated frequently, so if any portion is lost the consumer may simply wait for the next set of telemetry data to be transmitted. Accordingly, the fast path telemetry data may be formatted into packets compatible with such a protocol. In other embodiments, the fast path telemetry data may be formatted into packets compatible with any suitable protocol suited for packet transmission over a network.

In various embodiments, the fast path telemetry data may be authenticated (to prevent forgery/spoofing). Additionally, in some embodiments, the fast path telemetry data is encrypted to preserve confidentiality. For data that is transferred using a non-secure protocol (e.g., a non-HTTPS/TLS based protocol), an encryption approach that provides both authentication and encryption may be used, such as Advanced Encryption Standard-Galois/Counter Mode (AES-GCM). In various embodiments, a keyed-hash message authentication code (HMAC) such as HMAC-SHA256 may be used to guarantee the integrity of the fast path telemetry data. In some embodiments, AES could be used separately to ensure confidentiality of the fast path telemetry data.

In various embodiments, telemetry management controller 126 may perform authentication operations with a consumer and then provide information associated with the authentication (e.g., a key received from a consumer) to one or more telemetry engines 150 to allow the telemetry engines to send authenticated data (e.g., to provide a signature over the data).

In the embodiment depicted, components 202A-C (as well as other components including the telemetry management controller 126 and network interface controller 128) each include a telemetry engine 150 coupled to bus 220. In various embodiments, any suitable number of telemetry engines 150 of various components 202 of a platform may be coupled to a bus 220. An example telemetry engine 150 of component 202A will be described herein, though various embodiments contemplate any suitable telemetry engines which may each comprise any suitable logic. Each telemetry engine 150 may be capable of performing any combination of the operations described herein with respect to the example telemetry engine 150.

The telemetry engine depicted includes configuration registers 204, collection logic 206, timestamp logic 208, telemetry data processing logic 210, bus communication interface 212, and host interface 214.

Configuration registers 204 may comprise any suitable type of memory to store configuration data. In various embodiments, the configuration data is received from one or more telemetry management controllers 126 (e.g., via configuration interface 228) or via a host interface 214. Any suitable configuration data may be stored in configuration registers 204, such as indications of what telemetry data should be collected, whether the telemetry data should be reported via a fast path or a slow path, what type of processing should be performed on the telemetry data by the telemetry engine (in various embodiments, the telemetry engine 150 may be operable to perform all or a subset of the processing listed above with respect to the processing performed by telemetry data processing logic 230 of telemetry management controller 126), information associated with encryption and/or authentication of telemetry data, information (e.g., IP addresses) identifying consumers to which data is to be sent, polling rates for various sets of telemetry data, transmission rates for various sets of telemetry data, any other configuration information discussed herein, or other suitable configuration information. The values in the configuration registers may be used to configure logic of the telemetry engine 150 to operate in a manner consistent with the configuration information.

Collection logic 206 includes any suitable logic to gather telemetry data measured by component 202A. Collection logic 206 may collect telemetry data from various components within component 202A and provide the collected telemetry data to telemetry data processing logic 210. The collection logic 206 may collect the various sets of telemetry data at any suitable intervals, such as the polling intervals specified by a consumer (e.g., as stored in configuration registers 204). In various embodiments, the collection logic 206 may provide data to the telemetry data processing logic 210 in conjunction with timestamp logic 208. Timestamp logic 208 may be operable to generate indications of the times at which the instances of telemetry data were collected. In various embodiments, each set of telemetry data may receive a unique timestamp. In some embodiments, a plurality of sets of data may share a common timestamp. The timestamps associated with the collected data are provided to the telemetry data processing logic 210 along with the underlying telemetry data.

Telemetry data processing logic 210 may include any suitable logic to process the telemetry data received from collection logic 206. In various embodiments, telemetry data processing logic 210 may include logic to perform any of the processing described above with respect to telemetry data processing logic 230 of telemetry management controller 126. In a particular embodiment, telemetry data processing logic 210 includes logic operable to produce fast path telemetry data and provide the fast path telemetry data directly to a network interface controller 128 (as opposed to sending telemetry data to a telemetry management controller 126 for processing before the telemetry data is sent to the network interface controller 128). In various embodiments, the fast path telemetry data provided by the telemetry engine 150 is addressed by the telemetry engine 150 to the network interface controller 128 (e.g., via an MCTP or other address). In particular embodiments, telemetry data processing logic 210 is operable to format the fast path telemetry data into packets (e.g., Ethernet packets) comprising one or more headers and payload data comprising the underlying telemetry data.

In a particular embodiment, the telemetry data processing logic 210 may include encapsulation logic that is operable to format the telemetry data in any suitable manner, such as any of the manners described above. In some embodiments, the encapsulation logic may also be operable to bundle the measured telemetry data with any suitable context information, such as an identifier of a mapping document associated with the telemetry data or one or more identifiers associated with one or more telemetry data sets included within the telemetry data.

In various embodiments, the telemetry data processing logic 210 may also include logic for encrypting and or digitally signing processed telemetry data. In various embodiments, the encryption and/or signing may be based upon one or more keys stored by the telemetry engine 150 (e.g., in configuration registers 204 or other memory).

In various embodiments, if the telemetry engine 150 has been configured to provide particular telemetry data via a slow path, then after appending a time stamp to the data collected by collection logic 206, the telemetry engine 150 may send the telemetry data to telemetry management controller 126 so that the controller 126 may process the telemetry data to produce the slow path telemetry data.

In particular embodiments, a telemetry engine 150 may be configured to provide particular telemetry data via a fast path that includes the telemetry management controller 126. For example, the telemetry management controller 126 may process the telemetry data into a format that is more compact than similar telemetry data that is processed via a slow path by the telemetry management controller 126. As one example, when producing fast path telemetry data, the telemetry management controller 126 may bundle the measured telemetry data with context information (but in a more compact format than the context information included via slow path telemetry data).

In various embodiments, telemetry engine 150 sends instances of telemetry data (which may be fast path telemetry data or raw data to be processed by the telemetry management controller) to telemetry management controller 126 or network interface controller 128 at a transmission rate specified by the registering consumer.

Telemetry data may be sent by the telemetry engine to a telemetry management controller 126 or network interface controller 128 via bus communication interface 212, which may have any combination of the characteristics of bus communication interface 224 of the telemetry management controller 126. For example, in one embodiment, the bus communication interface 212 is an MCTP interface.

In various embodiments, in addition to or as an alternative to providing fast path telemetry data to one or more consumers via the network interface controller 128, telemetry engine 150 may provide fast path telemetry data to a consumer via a host interface 214. The host interface 214 may provide an interface to send the fast platform telemetry data to memory 114, a CPU 112, or other component of the platform 102 for eventual provision to a consumer that has direct access to platform 102 (e.g., the consumer may view a display that is coupled to the platform 102). In particular embodiments, the fast platform telemetry data may be delivered to the consumer via a software application running on the platform.

Network interface controller 128 may couple one or more telemetry engines 150 and one or more telemetry management controllers 126 to one or more computing devices via network 108. In the embodiment depicted, network interface controller 128 includes a bus communication interface 216, which may have any combination of the characteristics of bus communication interface 224 of the telemetry management controller 126. In particular embodiments, bus communication interface 216 is a sideband interface that is dedicated to telemetry data and associated configuration data (e.g., the network interface controller 128 may include one or more other interfaces to communicate data used by the CPUs 112 or other logic of the platform). Network interface controller 128 may also include a network interface 218 that interfaces with the network 108 to send and receive data packets over the network 108. Network interface controller 128 may receive configuration data from computing devices over network 108 (e.g., computing nodes 104) and provide the configuration data to the telemetry management controllers 126 via bus 220. Network interface controller 128 may also receive slow path telemetry data from telemetry management controllers 126 or fast path telemetry data from telemetry engines 150 or telemetry management controllers 126 over bus communication interface 216, format the telemetry data in a manner suitable for transmission over network 108, and send the formatted telemetry data to consumers via network interface 218.

As described above, a consumer that receives fast path telemetry data may recover context of the data by using a mapping document associated with the fast path telemetry data. By reference to the mapping document, the consumer is able to determine how to parse the fast path telemetry data and to determine the context associated with each piece of telemetry data. In various embodiments, slow path telemetry data obtained by a consumer may be correlated with matching fast path telemetry data by using one or more identifiers that are included within the slow path telemetry data. (e.g., property URIs in the case of Redfish). In particular embodiments, the consumer may use these identifiers to request that the platform deliver the corresponding platform telemetry data via the fast path. In a particular embodiment, a consumer may use the mapping document (which in some embodiments could include an instance of measured telemetry data within slow-path telemetry data) to process fast path telemetry data into a format that is equivalent to the format of slow-path telemetry data (e.g., a format that conforms with a telemetry data standard).

Figure 3:
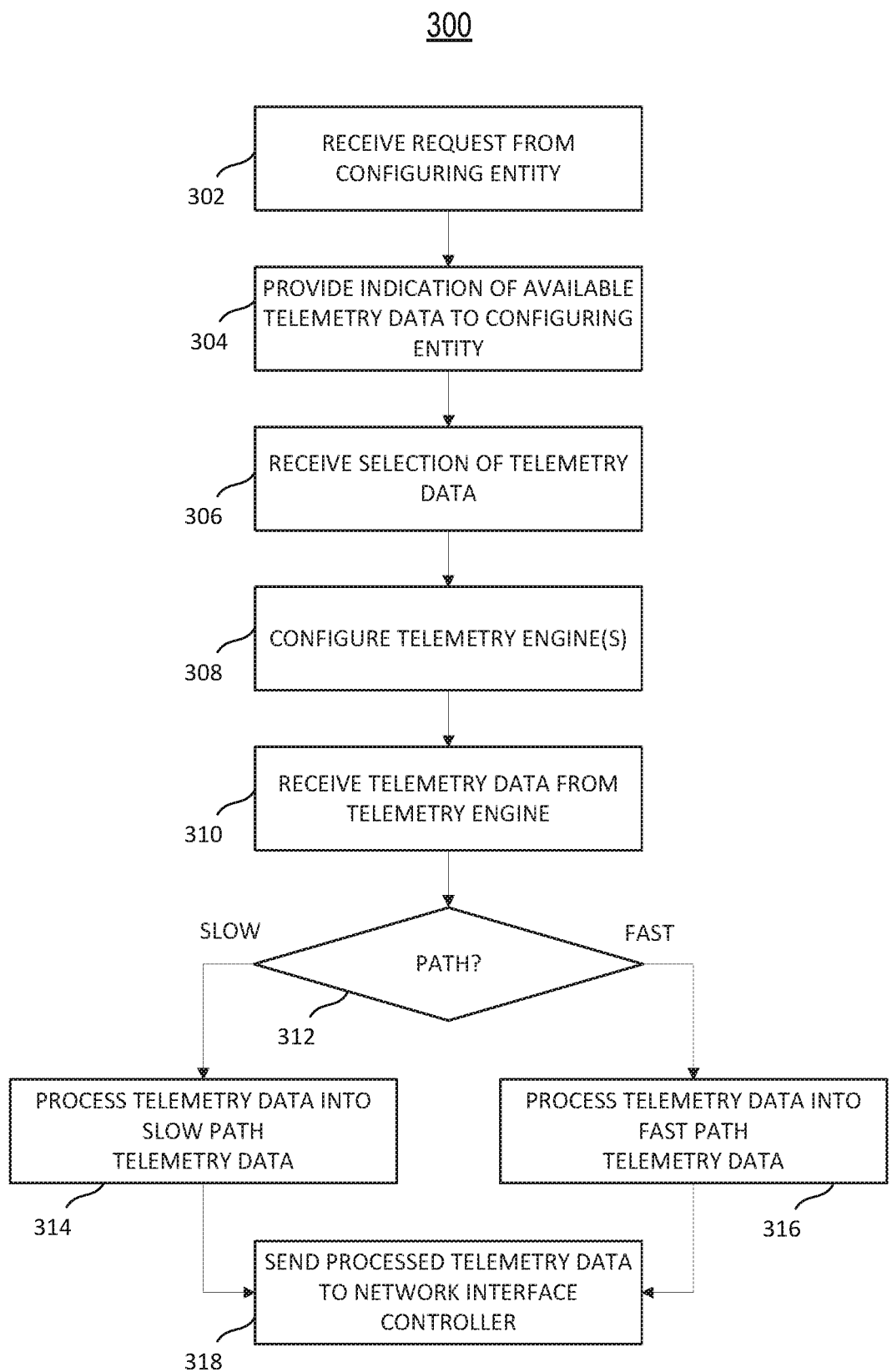
FIG. 3 illustrates a flow for providing a slow path and a fast path for platform telemetry data accordance with certain embodiments.

FIG. 3 illustrates a flow 300 for providing a slow path and a fast path for platform telemetry data accordance with certain embodiments. The flow 300 depicts example operations that may be performed by any suitable logic of a computing platform, such as one or more components of a telemetry management controller 126.

At 302, a request is received from a configuring entity (e.g., a computing device of a registering consumer). At 304, an indication of telemetry data that is available to the configuring entity is provided. At 306, a selection of telemetry data is received. In a particular embodiment, the selection may indicate whether the telemetry data should be provided via a fast path or a slow path. In another embodiment, the initial selection may simply indicate that the telemetry data should be provided, and an indication that the telemetry data should be provided via a fast path may be received later (e.g., after the consumer has received slow path telemetry data). At 308, one or more telemetry engines 150 are configured to provide the selected telemetry data.

At 310, telemetry data is received from a telemetry engine 150. At 312, it is determined whether the telemetry data should be provided via a slow path or a fast path. If the telemetry data is to be provided via a slow path, the telemetry data is processed into slow path telemetry data at 314. If the telemetry data is to be provided via a fast path, the telemetry data is processed into a fast path telemetry data at 316. In particular embodiment, if telemetry data is to be provided via a fast path, the telemetry engine may generate the fast path telemetry data and send the fast path telemetry data directly to a network interface controller 128, bypassing the telemetry management controller 126. Thus, in various embodiments, the operation at 316 may be performed by a telemetry engine, a telemetry management controller 126, or a combination thereof (e.g., in particular embodiments, a telemetry engine 150 may perform a portion of the processing of the fast path telemetry data and then provide the processed data to telemetry management controller 126 to complete the processing). At 318, the processed telemetry data is provided to a network interface controller for transmission to a consumer. Alternatively, the processed telemetry data may be provided to a consumer via a local host interface.

The flow described in FIG. 3 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 3 may be repeated, combined, modified or deleted where appropriate. Additionally, operations may be performed in any suitable order without departing from the scope of particular embodiments.

Figure 4:
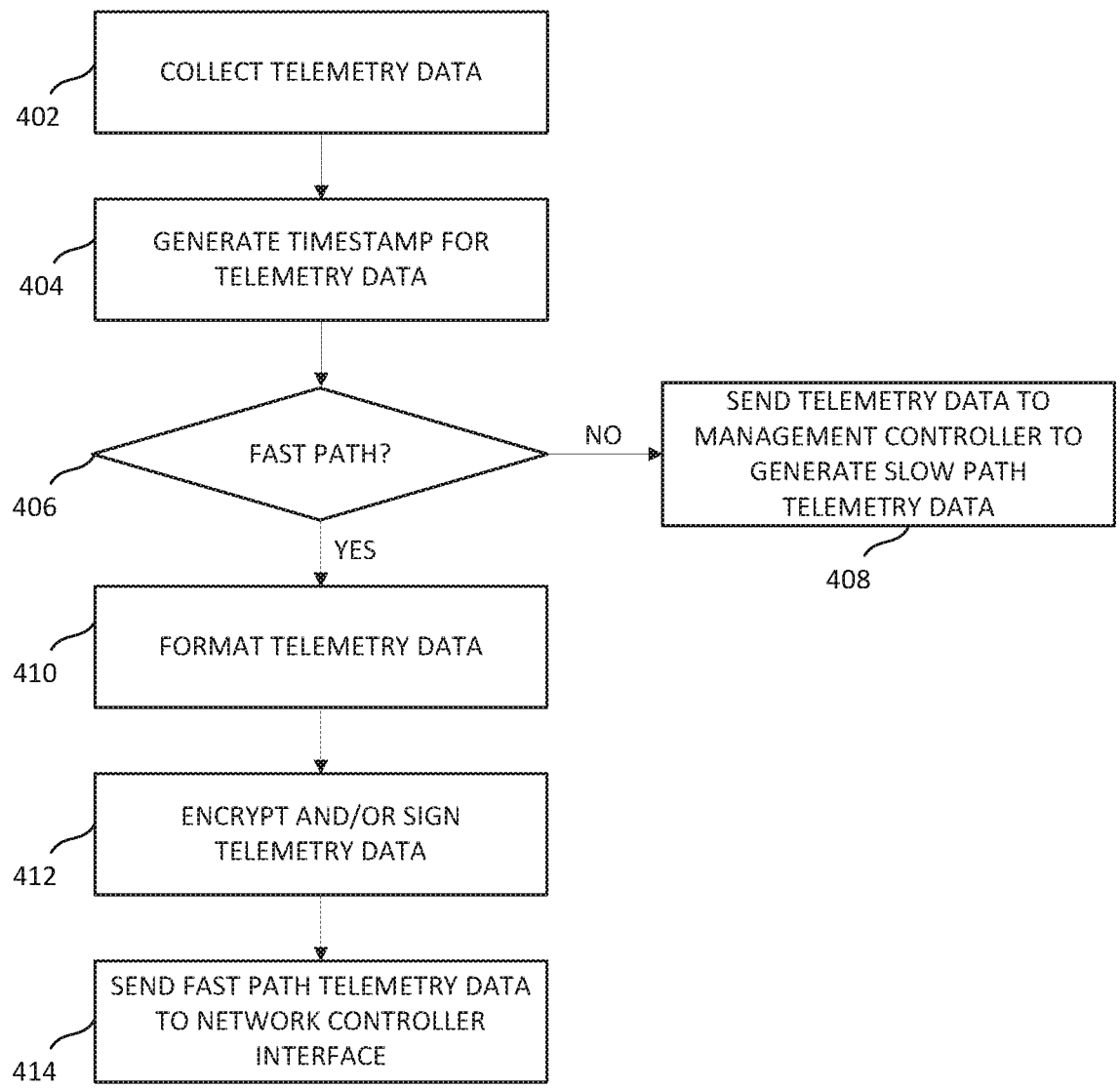
FIG. 4 illustrates a flow for providing telemetry data via a slow path and a fast path in accordance with certain embodiments.

FIG. 4 illustrates a flow 400 for providing telemetry data via a slow path and a fast path in accordance with certain embodiments. The flow 400 depicts example operations that may be performed by any suitable logic, such as one or more components of a telemetry engine 150.

At 402, telemetry data is collected from one or more components. At 404, at least one timestamp is generated for the collected telemetry data. At 406, it is determined whether the collected data should be transmitted via a fast path. If the data is not to be transmitted via the fast path, the telemetry data is sent to a telemetry management controller for generation of slow path telemetry data to be provided to the consumer. At 410, if it is determined that the data is to be transmitted via the fast path, then the data is formatted into fast path telemetry data (e.g., using any suitable formatting described herein). At 412, the formatted data is encrypted and/or signed. At 414, the fast path telemetry data is sent to a network controller interface for transmission to a consumer.

The flow described in FIG. 4 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 4 may be repeated, combined, modified or deleted where appropriate. Additionally, operations may be performed in any suitable order without departing from the scope of particular embodiments.

Figure 5:
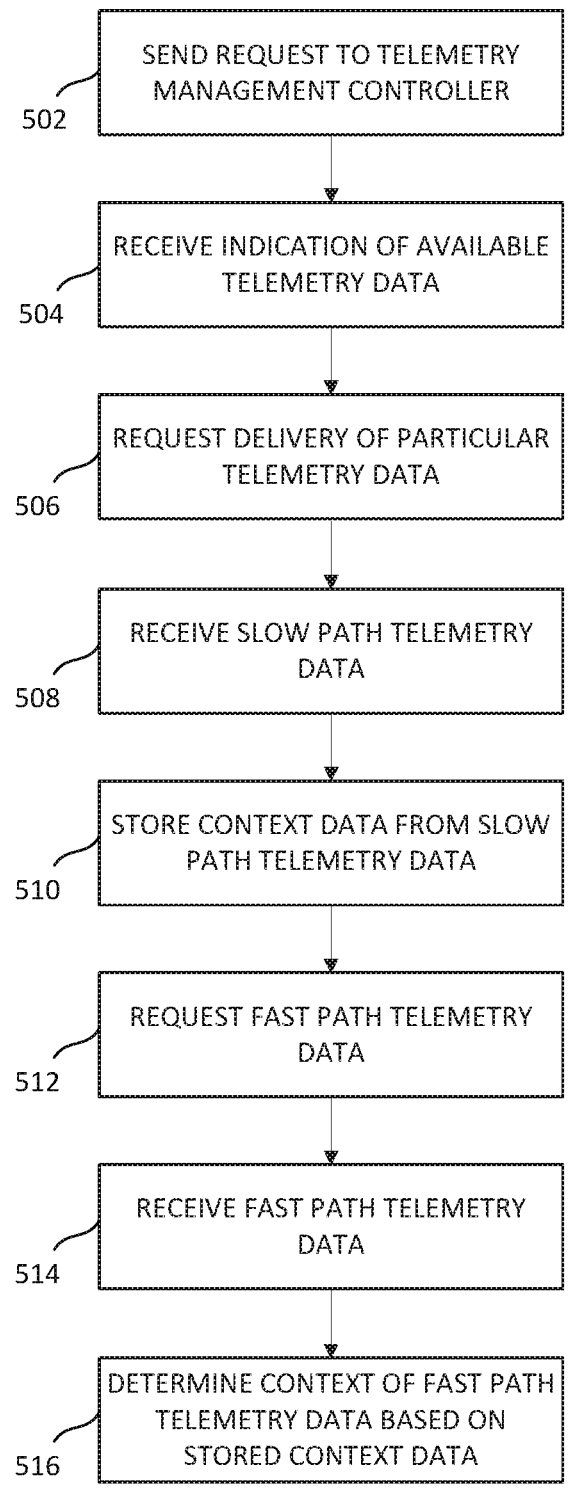
FIG. 5 illustrates a flow for requesting and consuming telemetry data in accordance with certain embodiments.

FIG. 5 illustrates a flow 500 for requesting and consuming telemetry data in accordance with certain embodiments. The flow 500 depicts example operations that may be performed by any suitable logic, such as one or more components of a computing device of a consumer.

At 502, a request is sent to a telemetry management controller. For example, the request may be a request to register to receive telemetry data from a computing platform. At 504, an indication of available telemetry data is received. At 506, the delivery of particular telemetry data may be requested by the consumer (e.g., by selecting telemetry data from the available telemetry data). At 508, slow path telemetry data with an instance of the requested telemetry data is received by the consumer. Alternatively, the consumer could receive a mapping document that includes context data associated with the telemetry data but does not include a measured instance of the telemetry data. At 510, context data from the slow path telemetry data (or other mapping document) is stored by the computing device of the consumer. At 512, fast path telemetry data is requested (e.g., by reference to one or more identifiers of the telemetry data obtained from the slow path telemetry data or other mapping document). At 514, fast path telemetry data including an instance of measured telemetry data is received. At 516, the context of the fast path telemetry data is determined based on the previously stored context data.

The flow described in FIG. 5 is merely representative of operations that may occur in particular embodiments. In other embodiments, additional operations may be performed by the components of system 100. Various embodiments of the present disclosure contemplate any suitable signaling mechanisms for accomplishing the functions described herein. Some of the operations illustrated in FIG. 5 may be repeated, combined, modified or deleted where appropriate. Additionally, operations may be performed in any suitable order without departing from the scope of particular embodiments.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the functionality of the various components such as platforms 102, computing nodes 104, CPU 112, accelerator 113, memory 114, chipsets 116, network interface controllers 118 and 128, telemetry management controllers 126, switches 130, telemetry engines 150, configuration registers 204, collection logic 206, timestamp logic 208, telemetry data processing logic 210 and 230, bus communication interfaces 212, 216, and 224, host interface 214, configuration logic 226, configuration interface 228, network interface 218, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a memory device containing instructions, combinations of logic devices (e.g., as would be found on an integrated circuit chip or printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In at least one embodiment, a system comprises a telemetry management controller to receive a request, from a computing device, for telemetry data measured by a plurality of components of a computing platform; provide, in a first communication, contextual information associated with the requested telemetry data, wherein the contextual information comprises information describing the plurality of components; and configure a telemetry engine to provide an instance of the requested telemetry data to the computing device, wherein the instance of the requested telemetry data is provided in a second communication that omits at least a portion of the contextual information describing the plurality of components.

In an embodiment, the telemetry management controller is further to provide, to the computing device, a unique identifier associated with the contextual information; and the telemetry engine is further to provide the unique identifier with the instance of the requested telemetry data in the second communication. In an embodiment, the first communication further comprises another instance of the requested telemetry data. In an embodiment, the first communication is sent from the system to the computing device using a protocol that guarantees delivery of the communication and the second communication is sent using a protocol that does not guarantee delivery of the communication. In an embodiment, the instance of the requested telemetry data of the second communication is encoded in a format that is more compact than a format used to encode the instance of the requested telemetry data of the first communication. In an embodiment, the instance of the requested telemetry data of the first communication is encoded in a format that is compliant with a standard published by the Distributed Management Task Force (DMTF). In an embodiment, the telemetry engine is further to collect the instance of the requested telemetry data from the plurality of components of the computing platform; encapsulate the instance of the requested telemetry data within one or more packets; and send the one or more packets to a network interface controller for transmission to the computing device. In an embodiment, the telemetry engine is further to digitally sign the one or more packets prior to sending the one or more packets to the network interface controller. In an embodiment, the telemetry engine is further to encrypt the one or more packets prior to sending the one or more packets to the network interface controller. In an embodiment, the system further comprises a network interface controller coupled to the telemetry management controller and the telemetry engine by a bus, the network interface controller to send the first communication and second communication to the computing device. In an embodiment, the network interface controller and telemetry management controller are integrated together on the same integrated circuit chip. In an embodiment, the telemetry management controller, the telemetry engine, and a network interface controller are to communicate with each other via the Management Component Transport Protocol (MCTP).

In at least one embodiment, a method comprises receiving, a request from a computing device for telemetry data measured by a plurality of components of a computing platform; providing, in a first communication, contextual information associated with the requested telemetry data, wherein the contextual information comprises information describing the plurality of components; and configuring, by a telemetry management controller, a telemetry engine to provide an instance of the requested telemetry data to the computing device, wherein the instance of the requested telemetry data is provided in a second communication that omits at least a portion of the contextual information describing the plurality of components.

In an embodiment, the method further comprises providing to the computing device a unique identifier associated with the contextual information; and providing the unique identifier with the instance of the requested telemetry data in the second communication. In an embodiment, the first communication further comprises another instance of the requested telemetry data. In an embodiment, the method further comprises sending the first communication using a protocol that guarantees delivery of the communication and sending the second communication using a protocol that does not guarantee delivery of the communication. In an embodiment, the instance of the requested telemetry data of the second communication is encoded in a format that is more compact than a format used to encode the instance of the requested telemetry data of the first communication. In an embodiment, the instance of the requested telemetry data of the first communication is encoded in a format that is compliant with a standard published by the Distributed Management Task Force (DMTF). In an embodiment, the method comprises collecting the instance of the requested telemetry data from the plurality of components of the computing platform; encapsulating the instance of the requested telemetry data within one or more packets; and sending the one or more packets to a network interface controller for transmission to the computing device. In an embodiment, the method further comprises digitally signing the one or more packets prior to sending the one or more packets to the network interface controller. In an embodiment, the method further comprises encrypting the one or more packets prior to sending the one or more packets to the network interface controller. In an embodiment, the method further comprises sending, by a network interface controller, the first communication and second communication to the computing device, wherein the network interface controller is coupled to the telemetry management controller and the telemetry engine by a bus. In an embodiment, a network interface controller and the telemetry management controller are integrated together on the same integrated circuit chip. In an embodiment, the telemetry management controller, the telemetry engine, and a network interface controller are to communicate with each other via the Management Component Transport Protocol (MCTP). In an embodiment, an apparatus comprises means for performing the method. In an embodiment, machine-readable storage including machine-readable instructions, when executed, may implement the method. In an embodiment, an apparatus comprising logic, at least a portion of which is in hardware logic, may perform the method.

In at least one embodiment, a system comprises a telemetry engine to collect telemetry data produced by a plurality of components of a computing platform; send first telemetry data via a first path to a telemetry management controller, wherein telemetry data sent via the first path is bundled with context information by the telemetry management controller; receive configuration data indicating that second telemetry data is to be sent via a second path; and send second telemetry data via the second path to a network interface controller, wherein telemetry data sent via the second path omits at least a portion of the context information bundled with telemetry data sent via the first path.

In an embodiment, the telemetry management controller is to send the bundled first telemetry data and context information to the network interface controller. In an embodiment, the telemetry engine is further to encapsulate the second telemetry data within one or more packets prior to sending the second telemetry data to the network interface controller. In an embodiment, the telemetry engine is further to digitally sign the one or more packets prior to sending the one or more packets to the network interface controller. In an embodiment, the telemetry engine is further to encrypt the one or more packets prior to sending the one or more packets to the network interface controller.

In at least one embodiment, a method comprises receiving a request, from a computing device, for telemetry data measured by a plurality of components of a computing platform; providing, in a first communication, contextual information associated with the requested telemetry data, wherein the contextual information comprises information describing the plurality of components; and providing an instance of the requested telemetry data to the computing device, wherein the instance of the requested telemetry data is provided in a second communication that omits at least a portion of the contextual information describing the plurality of components.

In an embodiment, the method further comprises providing, to the computing device, a unique identifier associated with the contextual information; and providing the unique identifier with the instance of the requested telemetry data in the second communication. In an embodiment, the first communication further comprises another instance of the requested telemetry data.

In at least one embodiment, a system comprises means to collect telemetry data produced by a plurality of components of a computing platform; means to send first telemetry data via a first path to a telemetry management controller, wherein telemetry data sent via the first path is bundled with context information by the telemetry management controller; means to receive configuration data indicating that second telemetry data is to be sent via a second path; and means to send second telemetry data via the second path to a network interface controller, wherein telemetry data sent via the second path omits at least a portion of the context information bundled with telemetry data sent via the first path.

In an embodiment, the system further comprises means to send the bundled first telemetry data and context information to the network interface controller. In an embodiment, the system further comprises means to encapsulate the second telemetry data within one or more packets prior to sending the second telemetry data to the network interface controller. In an embodiment, the system further comprises means to digitally sign the one or more packets prior to sending the one or more packets to the network interface controller. In an embodiment, the system further comprises means to encrypt the one or more packets prior to sending the one or more packets to the network interface controller.

In at least one embodiment, a method comprises collecting telemetry data produced by a plurality of components of a computing platform; sending first telemetry data via a first path to a telemetry management controller, wherein telemetry data sent via the first path is bundled with context information by the telemetry management controller; receiving configuration data indicating that second telemetry data is to be sent via a second path; and sending second telemetry data via the second path to a network interface controller, wherein telemetry data sent via the second path omits at least a portion of the context information bundled with telemetry data sent via the first path.

In an embodiment, the telemetry management controller is to send the bundled first telemetry data and context information to the network interface controller. In an embodiment, the method further comprises encapsulating the second telemetry data within one or more packets prior to sending the second telemetry data to the network interface controller. In an embodiment, the method further comprises digitally signing the one or more packets prior to sending the one or more packets to the network interface controller. In an embodiment, the method further comprises encrypting the one or more packets prior to sending the one or more packets to the network interface controller.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A system comprising:
a telemetry management controller to:
receive a request, from a computing device, for manageability data of a computing platform belonging to a server group, measured by a plurality of computing components;
provide, in a first communication, fast-path telemetry data associated with the requested manageability data, wherein the fast-path telemetry data comprises information describing the plurality of components; and
configure and execute a telemetry engine to provide an instance of slow-path telemetry data to the computing device, wherein the slow-path telemetry data are separated from the fast-path telemetry and provided in a second communication, and wherein the slow-path telemetry data conform to a manageability data standard.

2. The system of claim 1, wherein:
the telemetry management controller is further to provide, to the computing device, a unique identifier associated with the fast-path telemetry data; and
the telemetry engine is further to provide the unique identifier with the slow-path telemetry data in the second communication.

3. The system of claim 1, wherein the first communication further comprises another instance of the slow-path telemetry data.

4. The system of claim 3, wherein the first communication is sent from the system to the computing device using a protocol that guarantees delivery of the communication and the second communication is sent using a protocol that does not guarantee delivery of the communication.

5. The system of claim 3, wherein the instance of the slow-path telemetry data of the second communication is encoded in a format that is more compact than a format used to encode the instance of the fast-path telemetry data of the first communication.

6. The system of claim 3, wherein the instance of the slow-path telemetry data of the first communication is encoded in a format that is compliant with a standard published by the Distributed Management Task Force (DMTF).

7. The system of claim 1, wherein the telemetry engine is further to:
collect the slow-path telemetry data from the plurality of computing components of the computing platform belonging to the server group;
encapsulate the slow-path telemetry data within one or more packets; and
send the one or more packets to a network interface controller for transmission to the computing device.

8. The system of claim 7, wherein the telemetry engine is further to digitally sign the one or more packets prior to sending the one or more packets to the network interface controller.

9. The system of claim 7, wherein the telemetry engine is further to encrypt the one or more packets prior to sending the one or more packets to the network interface controller.

10. The system of claim 1, further comprising a network interface controller coupled to the telemetry management controller and the telemetry engine by a bus, the network interface controller to send the first communication and second communication to the computing device.

11. The system of claim 10, wherein the network interface controller and telemetry management controller are integrated together onto a single integrated circuit.

12. The system of claim 10, wherein the telemetry management controller, the telemetry engine, and the network interface controller are to communicate with each other via the Management Component Transport Protocol (MCTP).

13. A system comprising:
a telemetry engine to:
collect manageability data produced by a plurality of components of a computing platform belonging to a server group;
send fast-path telemetry via a first path to a telemetry management controller, wherein fast-path telemetry sent via the first path is bundled with fast-path telemetry data by the telemetry management controller;
receive configuration data indicating that slow-path telemetry data are to be sent via a second path; and
send the slow-path telemetry data via the second path to a network interface controller, wherein slow-path telemetry data sent via the second path omits at least a majority of the fast-path telemetry data bundled with fast-path telemetry sent via the first path.

14. The system of claim 13, wherein the telemetry management controller is to send the bundled fast-path telemetry and fast-path telemetry data to the network interface controller.

15. The system of claim 13, wherein the telemetry engine is further to encapsulate the slow-path telemetry data within one or more packets prior to sending the slow-path telemetry data to the network interface controller.

16. The system of claim 15, wherein the telemetry engine is further to digitally sign the one or more packets prior to sending the one or more packets to the network interface controller.

17. The system of claim 15, wherein the telemetry engine is further to encrypt the one or more packets prior to sending the one or more packets to the network interface controller.

18. A method comprising:
receiving a request, from a computing device, for manageability data of a computing platform belonging to a server group, measured by a plurality of computing components;
providing, in a first communication, fast-path telemetry data associated with the requested manageability data, wherein the fast-path telemetry data comprises information describing the plurality of components; and
providing and executing an instance of slow-path telemetry data to the computing device, wherein the slow-path telemetry data are separated from the fast-path telemetry data and provided in a second communication, and wherein the slow-path telemetry data conform to a manageability data standard.

19. The method of claim 18, further comprising:
providing, to the computing device, a unique identifier associated with the fast-path telemetry data; and
providing the unique identifier with the slow-path telemetry data in the second communication.

20. The method of claim 18, wherein the first communication further comprises another instance of the slow-path telemetry data.

21. A method comprising:
- collecting slow-path telemetry data produced by a plurality of components of a computing platform belonging to a server group;
- sending first slow-path telemetry data via a first path to a telemetry management controller, wherein the slow-path telemetry data sent via the first path are bundled with fast-path telemetry by the telemetry management controller;
- receiving configuration data indicating that second slow-path telemetry data to be sent via a second path; and
- sending second slow-path telemetry data via the second path to a network interface controller, wherein slow-path telemetry data sent via the second path omits at least a majority of the fast-path telemetry bundled with slow-path telemetry data sent via the first path.

22. The method of claim 21, wherein the telemetry management controller is to send the bundled first slow-path telemetry data and fast-path telemetry to the network interface controller.

23. The method of claim 21, further comprising encapsulating the second slow-path telemetry data within one or more packets prior to sending the second slow-path telemetry data to the network interface controller.

24. The method of claim 23, further comprising digitally signing the one or more packets prior to sending the one or more packets to the network interface controller.

25. The method of claim 23, further comprising encrypting the one or more packets prior to sending the one or more packets to the network interface controller.

* * * * *